United States Patent

[11] 3,626,387

[72] Inventor Louis M. Terman
South Salem, N.Y.
[21] Appl. No. 789,429
[22] Filed Dec. 24, 1968
[45] Patented Dec. 7, 1971
[73] Assignee International Business Machines Corporation
Armonk, N.Y.

[54] FET STORAGE-THRESHOLD VOLTAGE CHANGED BY IRRADIATION
18 Claims, 11 Drawing Figs.

[52] U.S. Cl. .......... 340/173 LS, 307/205, 307/279, 307/304, 340/173 R
[51] Int. Cl. .......... G11c 11/40, H03k 17/60
[50] Field of Search .......... 340/173, 173 LS; 307/308, 311, 304, 205, 279; 317/235, 21.1, 27; 315/8.5; 328/123, 124

[56] References Cited

UNITED STATES PATENTS

| | | | |
|---|---|---|---|
| 2,981,891 | 4/1961 | Horton | 340/173 UX |
| 3,401,294 | 9/1968 | Cricchi | 340/173 UX |
| 3,428,875 | 2/1969 | Snow | 317/235 |
| 3,506,971 | 4/1970 | Sakurai | 340/173 |
| 3,508,211 | 4/1970 | Wegener | 340/173 |

OTHER REFERENCES

Speth, Electron Beam Control of FET Characteristics, 9/65, IBM Tech. Disclosure Bul. Vol. 8 No. 4, p. 638, 639.

*Primary Examiner*—Bernard Konick
*Assistant Examiner*—Stuart Hecker
*Attorney*—Hanifin & Jancin

ABSTRACT: An electron beam irradiated memory cell which stores information representative of both "ones" and "zeros" by the application of appropriate voltages during irradiation is disclosed. Depending on the potentials applied to the source, drain and gate electrodes of an insulated gate FET, the threshold of the device is either raised or lowered. In the raised condition, a signal cannot pass through the device, showing that a "zero" has been affirmatively stored in the IG FET. In the lowered condition, a signal can pass through the device indicating that "one" has been affirmatively stored in the IG FET. The adjustment of the threshold is completely reversible. The method also includes the step of reading or detecting the condition of the IG FET by applying potentials to it in the absence of irradiation. Specific storage devices and apparatus for storing information in an array and a read-only memory are also disclosed.

FIG. 1a

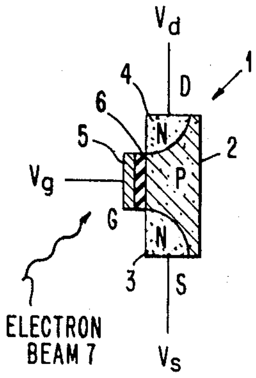

FIG. 1b

| | RELATIVE VALUES OF VOLTAGES APPLIED TO FET | CHANNEL CONDITION | OXIDE CHARGE CONDITION (EFFECTIVE) | THRESHOLD VOLTAGE |
|---|---|---|---|---|
| A) | $V_g$ LESS POSITIVE THAN $V_s$ OR $V_d$ | OFF | ↓ | ↑ |
| B) | $V_g$ MORE POSITIVE THAN $V_s$ AND $V_d$ | ON | ↑ | ↓ |

↑ PARAMETER GOES MORE POSITIVE FOR N CHANNEL IGFET

↓ PARAMETER GOES MORE NEGATIVE FOR N CHANNEL IGFET

FIG. 1c

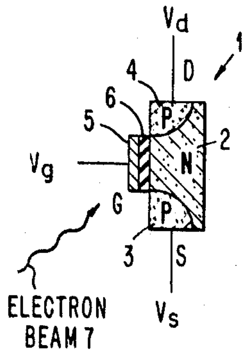

FIG. 1d

| | RELATIVE VALUES OF VOLTAGES APPLIED TO FET | CHANNEL CONDITION | OXIDE CHARGE CONDITION (EFFECTIVE) | THRESHOLD VOLTAGE |
|---|---|---|---|---|
| C) | $V_g$ LESS POSITIVE THAN $V_s$ AND $V_d$ | ON | ↓ | ↑ |
| D) | $V_g$ MORE POSITIVE THAN $V_s$ OR $V_d$ | OFF | ↑ | ↓ |

↑ PARAMETER GOES MORE POSITIVE FOR P CHANNEL IGFET

↓ PARAMETER GOES MORE NEGATIVE FOR P CHANNEL IGFET

INVENTOR.
LEWIS M. TERMAN
BY Thomas J. Kilgannon Jr.
ATTORNEY $V_1 < V_2$ $V_1 < V_2$

FET STORAGE-THRESHOLD VOLTAGE CHANGED BY IRRADIATION

BACKGROUND OF THE INVENTION

1. Field of the Invention

This invention relates generally to information storage arrangements which utilize electron beam irradiation of insulated gate field effect transistors IG FET) to effect the storage of information. More specifically, it relates to a method and apparatus for affirmatively writing "ones" and "zeros" into an IG FET device while irradiating the insulated gate thereof with an electron beam. The invention also relates to a method nd apparatus for reading the stored information in the absence of irradiation. The method and apparatus disclosed provides high speed writing in a high bit density environment and an electronically accessible read only memory which can also be changed electronically.

2. Description of the Prior Art

Devices which store electrical energy in various forms have been known for a number of years including arrangements which incorporate field effect devices or portions thereof as storage devices. The use of electron beam irradiation of the insulation in the gate region of the field effect transistor has also been known for a number of years. It has been recognized that electron bombardment or irradiation produces changes in the oxide, or at the oxide semiconductor interface, permitting, under appropriate voltage conditions, an enhancement of the conductivity of the device channel. This phenomenon has been used to good advantage in a prior art arrangement wherein a discrete portion of a gate insulator of an NPN FET has been irradiated while applying a positive voltage to change the conductivity of that discrete portion. This action is indicative of writing or storing a "one" in the gate insulator. To write a "zero" another similar portion is not irradiated. To read from such an arrangement, irradiation or electron bombardment is also required. Thus, to read a "one," a portion adjacent the initially irradiated portion is bombarded changing the conductivity of that portion, in effect, completing a high conductivity path between the source and drain electrodes of the field effect device. The conductivity of the resulting path is then determined and a "one" is sensed. To read a zero, a portion immediately adjacent the portion which was not irradiated previously is bombarded. The conductivity of the bombarded portion is, of course, increased but that portion in conjunction with the nonirradiated and, hence low conductivity, portion shows a high resistance. Upon sensing or investigation of its conductivity, a high resistance is sensed and a "-zero" is read.

From the foregoing, it is clear that to both write and read, electron bombardment is required which in turn requires the maintenance of vacuum conditions at all times. Also, while an electron beam can be scanned very swiftly, read out of information is essentially serial even though accessing is not sequential. The prior art, in effect, requires writing in of further information to determine if a "one" or a "zero" is present and, while it can be used as a read-only memory, its utilization is limited to a vacuum environment. Other prior art read-only memories which do not require a vacuum environment, suffer from the disadvantage that writing the information is an electromechanical operation which actually removes a conductive connection to render a path nonconducting thereby representing a zero when that particular path is interrogated. Changing information stored in this manner also represents a problem since restoration of mechanically interrupted paths is no simple matter. This sort of memory has, however, the advantage that the storage devices can be simple resistors or field effect transistor devices used only as resistors.

From the foregoing, it can be seen that the various prior art schemes each have advantages which the others do not possess. Any technique which combines the advantages without the corresponding disadvantages would find immediate acceptance in the memory art. As it is, the art has not provided any known scheme which can affirmatively write both "ones"

and "zeros" using electron bombarded field effect transistors, nor has it provided a reading technique for such devices which does not require irradiation by electrons.

SUMMARY OF THE INVENTION

The method of the present invention, in its broadest aspect, includes the steps of irradiating the insulated gate region of an insulated gate field effect transistor (hereinafter called an FET) and simultaneously applying potentials to it to reversibly change its threshold to conditions representative of either a "one" or a "zero." Because an affirmative and permanent "-zero" condition is attainable, a reading step can be accomplished by the application of appropriate potentials in the absence of irradiation. By controlling the threshold of the FET, the FET is switched into a high or low threshold condition; that is, the removal of the applied potentials does not return the FET to the condition it was in before the potentials were applied. Thus, an FET, in effect, has no quiescent state in the electron bombardment regime in that, once it is activated, it maintains its state without power consumption until switched to another permanent state.

The apparatus of the present invention in its broadest aspect, includes a discrete FET storage element having an insulated gate, electron beam means for bombarding the insulated gate and means for simultaneously applying potentials to the FET to set it in one of two possible permanent states, one state representing a binary one and the other a binary zero. Also, means connected to said FET for reading and sensing the states of the FET is included.

In a more specific aspect of the method of the present invention, the steps of applying specific potentials to the terminals of PNP and NPN FET's are disclosed. Depending on the type of device, NPN or PNP, the same changes in the oxide condition which increase the threshold in one type of device, act to reduce the threshold in the other.

Specific aspects of the apparatus of the present invention include a preferred memory cell and an evacuated electron beam apparatus having a removable faceplate. The faceplate contains a plurality of semiconductor substrates each containing an array of memory cells which can be written into by the simultaneous application of the proper potentials and electron beam irradiation. The faceplate memory arrays can be shifted to in-atmosphere operation as a read-only memory since irradiation is not required during reading.

The method of the present invention permits the affirmative writing of both binary ones and zeros and eliminates the necessity for electron bombardment during reading. The apparatus of the invention is as simple as known memory cells and conditioning the sole FET which comprises the cell is simpler than that required when connections must be mechanically interrupted. The read-only memory array aspect of the present invention eliminates the requirement for mechanical conditioning and changes in the condition of the memory cell can be made electronically.

It is, therefor, an object of this invention to provide a method of affirmatively writing both binary ones and zeros while irradiating the FET and also a method of reading which requires no irradiation.

Another object is to provide a method of writing into an electron-bombarded FET in which the threshold of the FET is reversibly elevated or reduced.

Still another object is to provide a memory cell in which no power is consumed other than during the application of pulsed voltages when reading or writing.

Yet another object is to provide a memory array in which each memory cell is a discrete FET which is amenable to production by integrated circuit techniques.

The foregoing and other objects, features, and advantages of the invention will be apparent from the following more particular description of preferred method steps and apparatus as illustrated in the accompanying drawings.

BRIEF DESCRIPTION OF THE DRAWINGS

FIG. 1*a* shows a schematic drawing of an FET device of the NPN or n-channel variety having an insulated gate.

FIG. 1*b* shows a table indicating the effect of applying various potentials to source, drain and gate connections on the channel condition, oxide charge and threshold of the device of FIG. 1*a* while irradiating the insulated gate.

FIG. 1*c* shows a schematic diagram of an FET device similar to that shown in FIG. 1*a* except that the FET is a PNP or p-channel device.

FIG. 1*d* shows a table similar to that shown in FIG. 1*b* indicating the effect on the channel condition, oxide charge and threshold of the FET device of FIG. 1*c* for the same applied potentials.

DESCRIPTION OF A PREFERRED EMBODIMENT

Figure 2A:
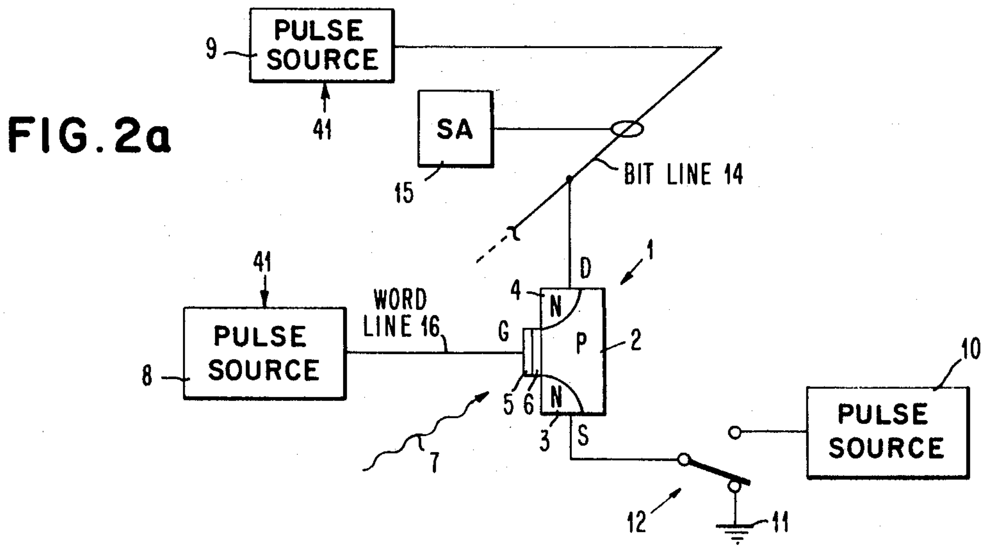
FIG. 2*a* shows a schematic diagram of a memory cell which uses power only during read and write operations.

Referring now to FIG. 1*a*, an insulated gate FET device 1 of the NPN or n-channel variety is shown. FET device 1 consists of a semiconductor substrate 2 of p-conductivity type into which source and drain regions, 3, 4, respectively, of n-conductivity type have been diffused. A gate electrode 5, usually of aluminum or other conductive material is shown in insulated spaced relationship from substrate 2 by an insulating layer 6 usually of silicon dioxide or other suitable insulating material. Electrical connections are shown extending from source 3, drain 4 and gate 5. Each of these interconnections is coupled to a source of potential and is indicated as $V_s$, $V_d$ and $V_g$, for source, drain and gate potentials, respectively. In FIG. 1*a*, an arrow 7 labeled "electron beam" is shown directed at gate 5. Arrow 7 is intended to show that gate electrode 5 is being bombarded by electrons to store or remove fixed positive charge in insulator 6 near the insulator-semiconductor interface. This effect is well known and has been extensively reported on by the prior art.

Referring now to FIG. 1*b* and considering it in conjunction with FIG. 1*a*, a table is shown in FIG. 1*b* and, under a heading Relative Values of Voltages Applied to FET, two conditions A and B are listed. The effect of these voltages applied to an n-channel FET with respect to the channel condition, the oxide charge condition and threshold voltage are shown in FIG. 1*b* under these headings, respectively. The tabulated conditions result from the voltage conditions at the various terminals of FET 1 in FIG. 1*a* while gate 5 is being irradiated with an electron beam. Thus, for condition A in FIG. 1*b*, which indicates that the voltage $V_g$ on gate 5 is less positive than the voltage on source 3 or drain 4, $V_s$ and $V_d$, respectively, the effective oxide charge becomes more negative, the threshold voltage becomes more positive, and the FET goes into a low conduction state. Hereinafter, this is called the OFF channel condition, although it should be appreciated that the channel may not be actually turned off (or eliminated) for all combinations of applied voltages. It should be carefully noted that as long as $V_g$ is less positive than either $V_s$ or $V_d$, the channel of FET 1 is effectively blocked and the threshold voltage $V_t$ required to turn FET 1 ON is increased (more positive voltage would be required in the instance being discussed to turn the channel ON). The OFF condition of the channel of FET 1 is permanent even though the electron beam has been removed and, the application of other potentials in the absence of electron beam irradiation will not affect the condition of the channel of FET 1.

For condition B in FIG. 1*b*, the voltage on gate 5, $V_g$ is more positive than both the voltage on source 3 and drain 4, $V_s$ and $V_d$, respectively. Under these voltage conditions and while irradiating gate 5 with electrons, the effective oxide charge condition goes more positive, the threshold voltage $V_t$ goes more negative, and the FET goes into a high conduction state. Hereinafter this is called the ON channel conduction, although it should be appreciated that the channel may not be actually turned ON or be present for all combinations of applied voltages. As long as $V_g$ is more positive than both $V_s$ and $V_d$, the channel of FET 1 is effectively open and the threshold voltage $V_t$ required to turn FET 1 ON is reduced. (A less positive voltage would be required in the instance being discussed to turn the channel ON.) Like the OFF condition, the ON condition is permanent and is affirmatively written by the application of electron beam and appropriate voltages. FIG. 1*b*, thus shows the conditions required to affirmatively write a binary "one" or a "zero" into a memory cell using an electron beam in both instances.

Referring now to FIG. 1*c*, an FET device 1 is shown which is similar to the device shown in 1*a* except that FET 1 is a PNP or p-channel device. Corresponding portions of FET 1 in FIGS. 1*a* and 1*c* have been given the same reference characters. FIG. 1*d* shows a table similar to that shown in FIG. 1*b*, except that channel conditions and the voltage conditions under the heading, Relative Values of Voltages Applied are not identical to the voltage conditions of FIG. 1*b*. Thus, FIG. 1*d* under the Relative Values of Voltages heading shows two conditions; $V_g$ is less positive than $V_s$ and $V_d$ and, $V_g$ is more positive than $V_s$ or $V_d$, characterized as conditions C and D, respectively. Using the voltages of condition C in FIG. 1*d*, the oxide charge is going more negative, the threshold voltage is going more positive and the channel condition is ON. (A less negative voltage would be required in the instance being discussed to turn the channel ON.)

Using the voltages of condition D in FIG. 1*d*, oxide charge is going more positive, the threshold voltage $V_t$ is going more negative and the channel condition is OFF, (a more negative voltage would be required in the instance being discussed to turn the channel ON).

From the foregoing, it can be seen that all possible voltage conditions for an FET device have been established which, in conjunction with the application of an electron beam, affirmatively write binary "ones" and "zeros" by controlling the ON and OFF state of an FET device.

It should be kept in mind that the prior art, until the present teaching has only suggested that the conduction of a portion of a gate could be modified to increase it thereby indicating a binary "one" condition. Affirmative writing of a binary "zero" was not taught but rather the expedient of nonirradiation was used to allow a portion of a gate region to remain in a highly nonconducting condition. Using the prior art technique of irradiating only a portion of the gate region of course required irradiation during readout. The present teaching, as will be seen hereinbelow, avoids the necessity for irradiation as a consequence of being able to affirmatively write a binary "zero" into an FET device.

Referring now to FIG. 2*a*, there is shown a memory cell consisting of a single FET connected to a number of pulse sources which is adapted to store binary "ones" and "zeros" depending on the pulse patterns applied to the terminals of the FET.

In FIG. 2*a*, the same reference characters have been applied to corresponding portions of the FET as previously. FET 1 is shown in FIG. 2*a* with its gate 5 and drain 4 connected to pulse sources 8, 9, respectively. Source 3 of FET 1 is connected either to a pulse source 10 or to ground 11 via a switch 12. Switch 12 is shown schematically but it may be any one of a number of electronic switching arrangements well known to those skilled in the electronics art. Switch 12 is normally grounded and, as will be seen herein below, need only be activated where it is required to fulfill a condition that the voltage on the gate of an FET $V_g$ be less positive than either the source voltage $V_s$ or the drain voltage $V_d$. A loop 13 shown coupled about bit line 14 is connected to a sense amplifier 15 to sense current flow in bit line 14. Sense amplifier 15 may be adjusted so that it is in the ON condition only during the read cycle by triggering means or the like. The word line in the arrangement of FIG. 2*a* is connected between source 8 and gate 5 and is designated as 16 therein.

Figure 2B:
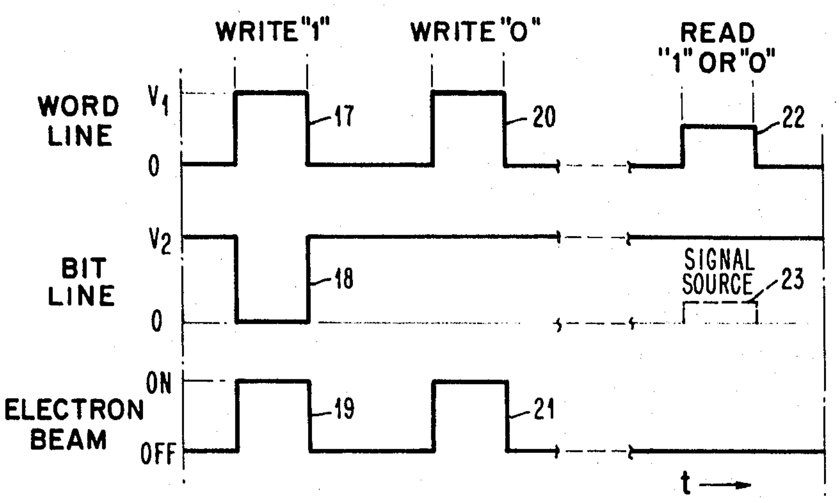
FIG. 2*b* shows pulse patterns which may be applied to the electrodes of the cell shown in FIG. 2*a* during the writing and reading of binary ones and zeros. The ON or OFF condition of an electron beam is also shown.
Figure 2C:
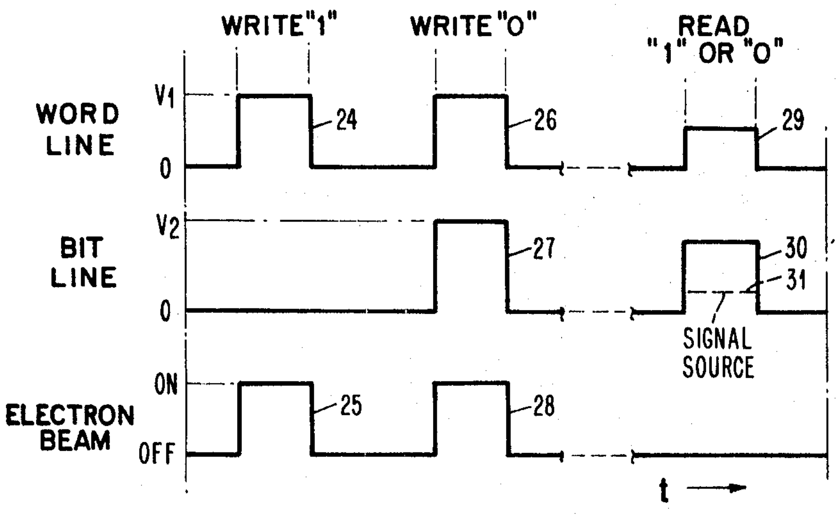
FIG. 2*c* shows another pulse pattern which may be applied to the memory cell shown in FIG. 2*a*.
Figure 2D:
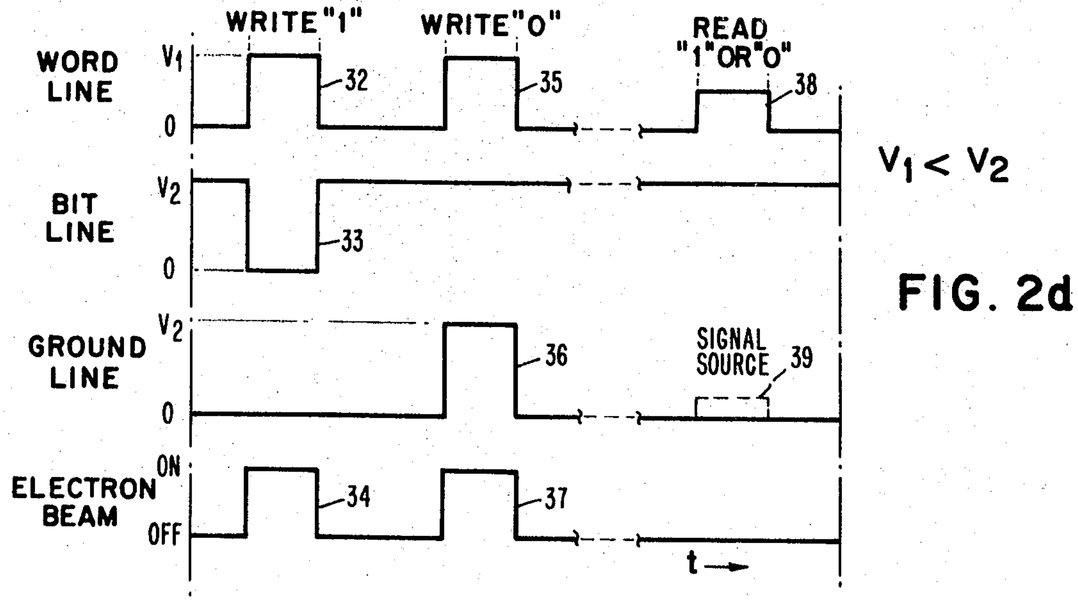
FIG. 2*d* shows still another pulse pattern which may be applied to the memory cell shown in FIG. 2*a*.

In operation, the memory cell of FIG. 2*a* can be activated by the application of any of the pulse patterns shown in FIG. 2*b*–2*da*. Electron beam bombardment is required during a writing operation but none is required during a reading operation. Thus, using the pulse pattern of FIG. 2*b*, to write a binary "one," a pulse of amplitude $V_1$ is applied from source 8 via word line 16 to gate 5 of FET 1. This voltage is shown as pulse 17 in FIG. 2*b*. Simultaneously, with the application of pulse 17, a change in voltage is applied from source 9 via bit line 14 to the drain 4 of FET 1. The change in voltage is a drop in voltage from a voltage $V_2$ to zero. This is shown as pulse 18 in FIG. 2*b*. Switch 12 of FIG. 2*a* connects drain 3 of FET 1 to ground 11. Voltage $V_1$ is less than the voltage $V_2$. Under the circumstance just described, for an NPN device, the voltages would conform to condition B shown in FIG. 1*b* , that is; $V_g$ is more positive than $V_s$ and $V_d$, and the channel of FET 1 is in the ON condition. The ON condition implies that a binary "one" has been written, while the OFF condition implies that a binary "-zero" has been written. Thus, in FIG. 2*a*, the value of positive threshold voltage required to turn FET 1 ON is reduced and once this is accomplished, the condition of FET 1 is permanent. The writing step just described takes place while gate 5 of FET 1 is being irradiated with an electron beam 7 and is shown as pulse 19 in FIG. 2*b*.

To write a binary "zero" into the arrangement of FIG. 2*a*, bit line 14 is maintained at a voltage $V_2$, while gate 5 is pulsed to a voltage $V_1$ from source 8 via word line 16. This latter voltage is shown as pulse 20 in FIG. 2*b*. With a voltage $V_2$ on drain 4, a voltage $V_1$ on gate 5 and ground on source 3, FET 1 meets the conditions of condition A in FIG. 1*b* and, the channel of FET 1 is in the OFF condition and a binary "zero" is written. Under these circumstances, it would take a very large positive voltage to turn FET 1 ON. Gate 5, of course, is being subjected to electron bombardment. This is represented by pulse 21 in FIG. 2. Under the circumstances just described, for an NPN device, the voltages applied to FET 1 would conform to condition A shown in FIG. 1*b*, that is, $V_g$ is less positive than $V_s$ or $V_d$ and the channel of FET 1 is in the OFF condition. Thus, in FIG. 2*a*, the value of positive threshold voltage required to turn FET 1 is increased and, once this is accomplished, the condition of FET 1 is permanent. It should be appreciated at this point that a binary "zero" has been affirmatively written by a combination of appropriate voltages and electron beam radiation.

To accomplish reading, a pulse of proper amplitude is applied to gate 5 of FET 1 from source 8 via word line 16 such that, for example, it conducts if it is in the ON condition, and does not conduct if it is in the OFF condition. This voltage is shown as pulse 22 in FIG. 1*b*. If the channel of FET 1 is in the ON condition, current will flow from pulse source 9 which is a voltage $V_2$ through the ON channel of FET 1 to ground 11. The resulting current pulse is shown in FIG. 2*b* as read sense current pulse 23. Since the channel of FET 1 is in the OFF condition after writing of a binary "zero," no current will flow on the application of read pulse 22 and the absence of a change of current in the reading time period indicates a binary zero has been stored.

It should be appreciated, however, that the conductivity condition of the channel reflects the binary information stored. Because of this, it should be clear that reading of the information stored can be accomplished in a number of different ways. Thus, a zero may be indicated by no conduction through the channel or by comparatively low conduction therethrough. A one condition may be indicated by a comparatively high conduction.

It should also be appreciated that the quiescent voltage applied to the memory cell would normally be chosen such that there is no conduction through the device. While this is not absolutely necessary, it is desirable from the standpoint of its circuit designer. For example, the channel condition of the device can be initially determined so that even when in the ON condition, the threshold voltage and the quiescent source to gate voltage are of such values that no current flows through the device. During reading, application of the gate voltage overcomes the threshold voltage so that conduction occurs for a device in the ON condition. The same amplitude of read pulse, applied to a device in the OFF condition, results in either no conduction or much smaller conduction.

FIG. 2*c* shows another pulse pattern which activates the memory cell of FIG. 2*a* by the application of proper potentials to the electrodes of FET 1 to store binary information. Thus, in FIG. 2*c*, a pulse 24 of amplitude $V_1$ is applied to gate 5 of FET 1 from source 8 via word line 16, while zero potential is applied via bit line 13 to drain 4 of FET 1. Source 3 is connected to ground 11 via switch 12. Electron beam bombardment indicated by pulse 25 in FIG. 2*c* is applied during the writing cycle. The application of these potentials to FET 1 conforms to condition B in FIG. 1*b*, that is, $V_g$ is more positive than $V_s$ and $V_d$. As a result, the channel of FET 1 is in the ON condition, the oxide charge is going more positive and the threshold voltage $V_t$ is going more negative. Thus, it would take a lower positive voltage than applied previously to turn the channel of FET 1 ON.

Referring again to FIG. 2*c*, a binary "zero" may be written into FET 1, by the application of pulse 26 of amplitude $V_1$ to gate 5 of FET 1 and pulse 27 of amplitude $V_2$ to drain 4 of FET 1 while source 3 is held at ground potential. Voltage $V_1$ is less than voltage $V_2$. Pulse 28 in FIG. 2*c* indicates that an electron beam is being applied to gate 5 simultaneously with pulses 26 and 27. The potentials applied conform to condition A in FIG. 1*b* and as a result the channel of FET 1 is switched to the OFF condition and a binary "zero" is written into FET 1. Reading the ON or OFF state of FET 1 is accomplished by applying a pulse 29 to word line 16 and a pulse 30 to bit line 14 in the absence of electron beam radiation and, a current pulse 31 is detected in sense amplifier 15 when the channel is ON. The absence of an output in sense amplifier 15 during a read cycle indicates that the channel of FET 1 is OFF and that a binary "zero" has been stored.

In FIG. 2*d*, to write a binary "one" into FET 1, a potential $V_1$ represented by pulse 32 is applied to gate 5 of FET 1 while zero potential is applied to both drain 4 and source 3. Zero potential is applied to drain 4, by reducing the drain voltage $V_2$ (see pulse 33 in FIG. 2*d*) from source 9 to zero during the write cycle. These voltages applied to the terminals of FET 1 while irradiating gate 5 with an electron beam (see pulse 34 in FIG. 2*d*) conform to condition B in FIG. 1*b* for an NPN device, that is, $V_g$ is more positive than $V_s$ and $V_d$. As a result, the channel of FET 1 is turned ON and a binary 1 is written into the device.

To write a "zero" into FET 1, a voltage $V_1$ represented by pulse 35 in FIG. 2*d* is applied to gate 5; a voltage $V_2$ is maintained on drain 4 from source 9 and; a potential equal to $V_2$ represented by pulse 36 is applied to source 3 via switch 12 from pulse source 10. Voltage $V_1$ is less than voltage $V_2$. The application of these potentials to the electrodes of FET 1 while irradiating (pulse 37 in FIG. 2*d*) conforms to condition B in FIG. 1*b*, that is, $V_g$ is less positive than $V_s$ or $V_d$. In this instance, $V_g$ is less than both $V_s$ and $V_d$ but the result is the same as if it were less than only one of these voltages. In any event, the combination of voltages shown while irradiating turns the channel of FET 1 OFF and a binary "zero" is written.

A read pulse 38 on word line 16 produces a sense current represented by pulse 39 in FIG. *2d* in sense amplifier 15 for a binary "one" or ON channel condition while no output during the read cycle represents a binary "zero."

From the foregoing, it can be seen that there are a number of voltage conditions which, in conjunction with electron beam radiation, store binary information in memory cells of the type shown in FIG. *2a*. While all the pulse patterns shown relate to NPN devices, it should be apparent from a consideration of FIG. *1d*, that there are a number of pulse patterns similar to those shown in FIGS. *2b–2d* which store binary information in a memory cell made from a PNP device. In general, the pulse patterns used for PNP devices should conform to conditions C and D shown in FIG. *1d*.

The advantage of being able to affirmatively write a zero should now become apparent. Much more flexibility is available in design of FET memories using electron beam irradiation, since the circuit designer is no longer constrained by what is available in the prior art. Also, since electron bombardment is not required during reading, a relatively simple, high-density read-only memory is available.

Figure 3:
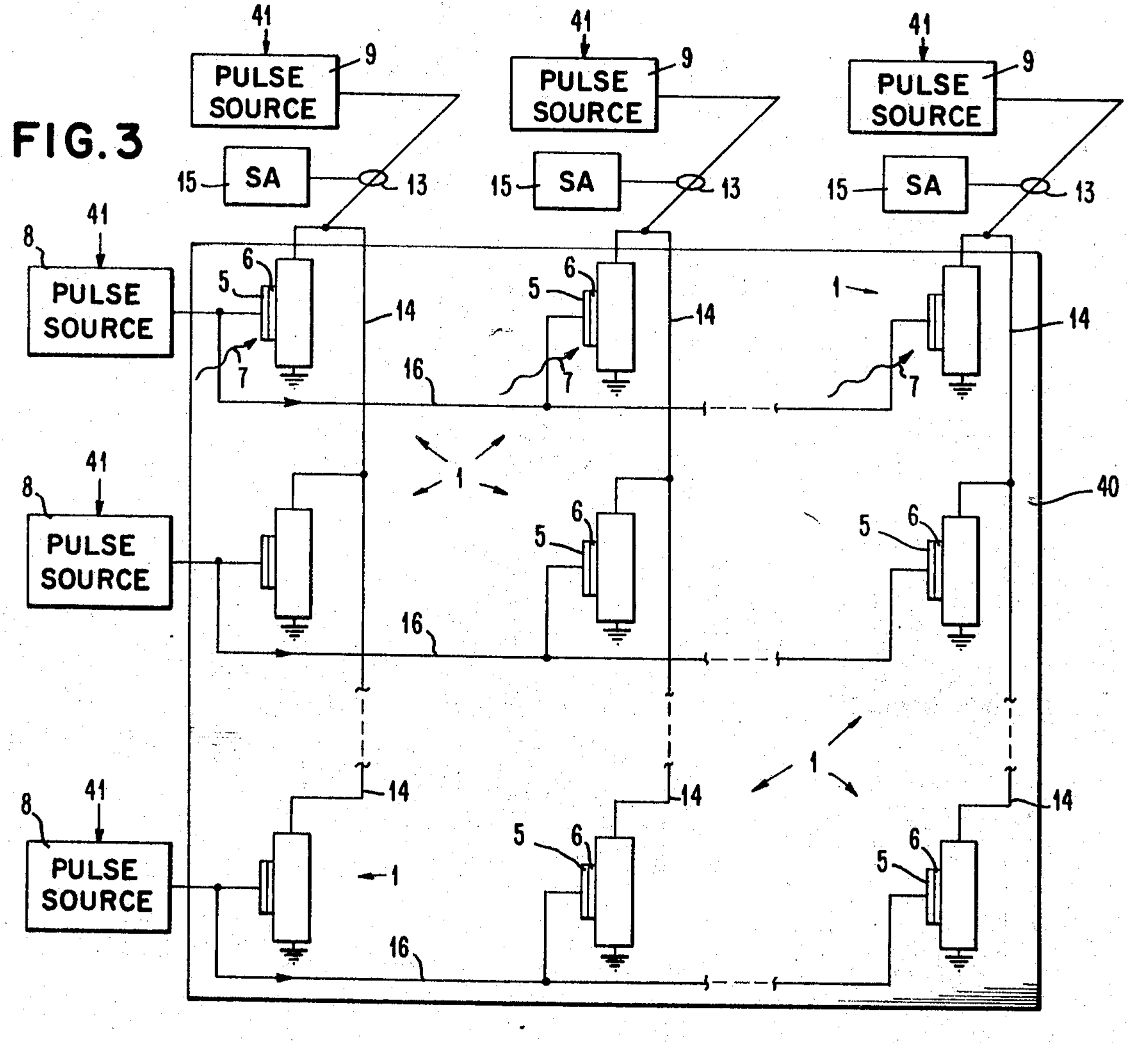
FIG. 3 shows a partial schematic, partial block diagram of an array of the memory cells of FIG. 2*a* mounted on a semiconductor chip.
Figure 4B:
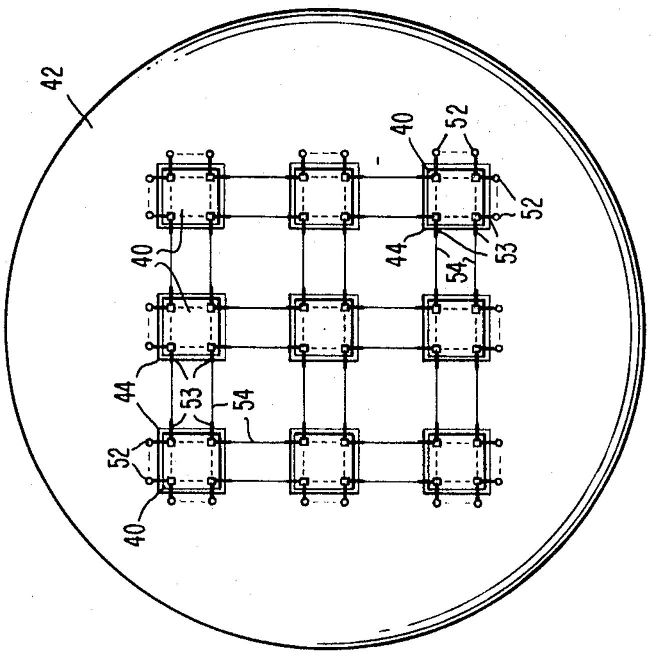
FIG. 4*b* is a view of the faceplate taken along line 4*b*—4*b* of FIG. 4*a* showing the arrangement of semiconductor substrates on the removable faceplate.
Figure 4A:
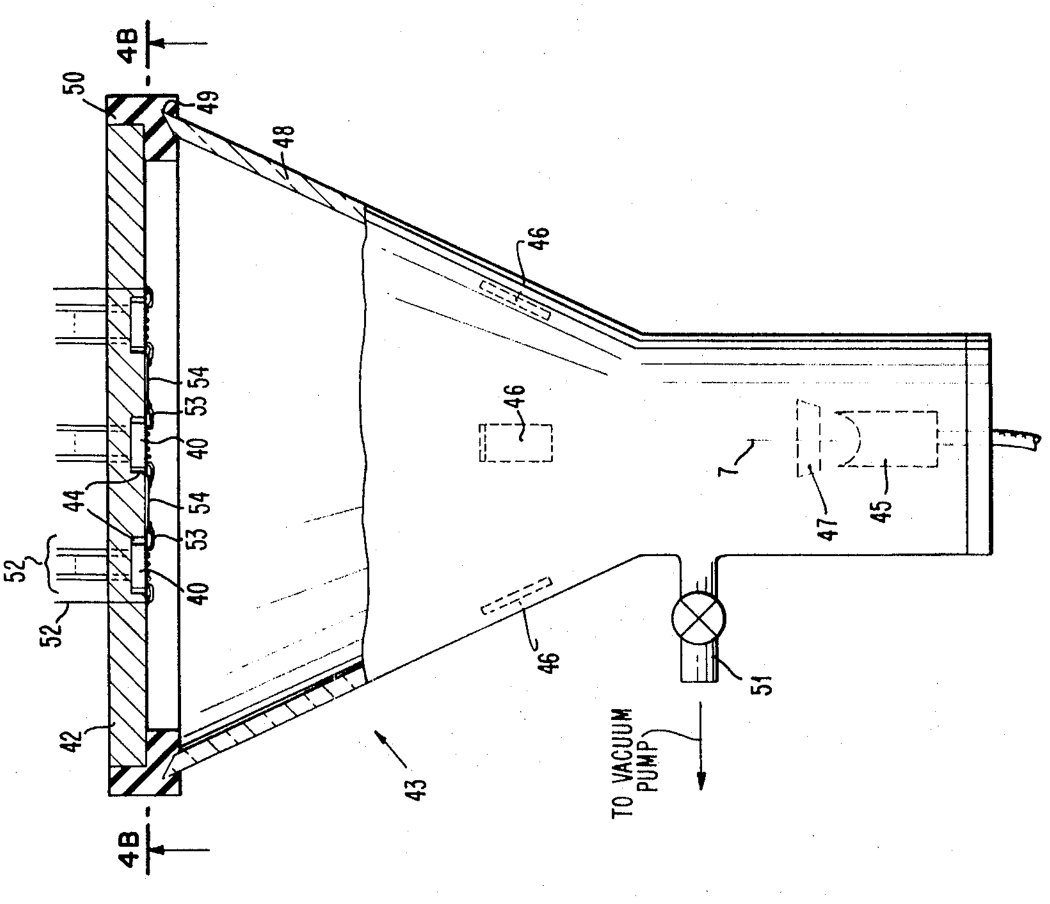
FIG. 4*a* shows a partial cross-sectional view of electron beam bombardment apparatus which includes a removable faceplate having recesses therein into which semiconductor substrates containing arrays of cells are placed for a writing operation.

Referring now to FIG. 3, there is shown a plurality of memory cells of FIG. *2a* arranged in the form of an array and mounted on or integral with a semiconductor substrate 40. Word lines 16 are shown crossing bit lines 14 in an orthogonal relationship. Each bit line 14 is common to a column of FET's 1 while each word line 16 is common to a row of FET's 1. The operation of the array of FET's is arranged so that the readout current from any column of FET's is carried by the bit-line 14 common to that column of FET's. It should be clear that bit line 14 can be arranged in other fashions thereby providing a layout flexibility not possible using prior art arrangement.

In the arrangement shown in FIG. 3, each of pulse sources 8 is shown connected to the gates 5 of a row of FET's 1 via word lines 16. Each of the pulse sources 9 is shown connected to drains 4 of a column of FET's 1 via bit lines 14. While pulse sources 8 have been shown separately connected to word lines 16, it should be appreciated that this is illustrative. Usually, pulse sources 8 would all be included in a register or other storage device which is fed from other portions of a computer system.

The simultaneous energization of a source 8, and each of the pulse sources 9 by triggering connections 41 from registers (not shown) using the pulse pattern of FIG. *1c*, for example, applies a pulse to the upper of word lines 16, thereby applying a voltage $V_1$ on the upper row of FET's 1, and either the potential $V_2$ or zero on each of the bit lines 14. An electron beam 7, in the form of either a sheet beam or a collimated beam is, of course, applied during the writing cycle. Use of a single collimated beam permits writing to take place in only one FET 1. Using the sheet beam permits the writing of a word rather than a single bit during a writing cycle. Depending on the voltage applied via bit lines 14, each of the FET's 1 in the upper row of the array stores either a binary "one" or "zero." Information can be permanently stored in all other memory cells of the array, by energizing their associated pulse sources in the same manner as just described.

Reading of the stored information, is accomplished by pulsing upper word line 16 from source 8, to some desired potential and simultaneously pulsing bit lines 14 from sources 9 to a voltage equal to $V_1$ so that current will flow as a result of the difference in potential between pulse sources 9 and ground when the FET's 1 are in the ON condition. When FET's 1 are in the OFF condition, of course, no current will flow. The flow of current is sensed by loops 13 inductively coupled to each bit line 14 and connected to an associated sense amplifier 15.

The FET's 1 shown in array form in FIG. 3, can be fabricated into a semiconductor substrate using a combination of oxide deposition, photolithographic and etching techniques, dopant diffusion, and metallization steps, the details of which are well known to those skilled in the semiconductor fabrication arts. Such details will not, therefore, be discussed since the novelty of the present invention does not reside in the fabrication of such arrays. It should be appreciated, however, that the semiconductor substrates on which such an array is formed can be 120 mils × 120 mils. Also, it should be appreciated that as many as 50–100 thousand separate FET's can be placed on a substrate of this size.

Because the FET's shown in the previous FIGS. undergo a permanent change during writing which cannot be changed except by subsequent irradiation, the arrays shown have great utility as read-only memories. Since reading does not require irradiation, there is no necessity for an electron gun with its associated focusing, positioning and vacuum maintaining apparatus. The apparatus of FIG. *4a* allows the use of electron bombardment during writing and the elimination of this apparatus during reading by the simple expedient of a removable faceplate 42 which can be detached from vacuum envelope 43 after writing.

In FIG. *4a* , during a writing operation, faceplate 42 which contains recesses 44 into which semiconductor substrates 40 are fastened by wax or other suitable adhesive is positioned against vacuum envelope 43. Vacuum envelope 43 contains an electron gun 45 and beam positioning and focusing electrodes 46, 47, respectively, all of which are types well known to those skilled in the cathode ray tube art. Electrodes 46 are connected to voltage sources (not shown) which provide voltage to electrodes 46 which, in turn, position electron beam 7 at any desired place on faceplate 42. Vacuum envelope 43 has a flared out portion 48 which terminates in a knife edge 49 of metallic or other suitable material and is disposed circumferentially about the rim of portion 48. Faceplate 42, contains a flexible gasket 50 which is adapted to mate with knife edge 49. Indexing prongs (not shown) insure the accurate positioning of a faceplate 42 in the same position each time another one is positioned on envelope 43. Once faceplate 42 is positioned, a vacuum pump (not shown) connected to exhaust tubulation 51 is actuated and pumping is continued until the desired vacuum condition is reached. Atmospheric pressure against faceplate 42 forces knife edge 49 against gasket 50, thereby forming an airtight seal. At this point, particular FET's 1 on the semiconductor substrates 40 can be irradiated and appropriate potentials applied via connections 52 which penetrate faceplate 42 and are connected to bit and word lines on the substrate 40 by conductive spring fingers 53.

FIG. *5b* is a sectional view taken along lines *tb—tb* of FIG. *5a*, which shows an exemplary arrangement of substrates 40 in faceplate 42. Connections 52 connect to spring fingers 53 which in turn, are connected to bit and word lines (not shown) on substrates 40. Interconnections 54, between substrates 40, may be permanently fixed to the surface of faceplate 42. Each of interconnection 54 terminates in conductive spring fingers 53.

Writing may be accomplished by irradiating a horizontal row of FET's disposed on the surface of substrates 40 and by applying appropriate potentials to a horizontal and all vertical interconnection 54 via connections 52 from voltage sources (not shown).

Upon completion of a writing operation, the vacuum is released and faceplate 42 is removed and introduced into an in-air system for use as a read-only memory.

What has been disclosed is a method for affirmatively writing binary ones and zeros into a single FET which comprises a memory cell while subjecting the FET to electron bombardment. The various combinations of potentials on the electrodes of the memory cell have been shown and extrapolations made which indicate the wide variety of possibilities in applying potentials to reversibly affect the threshold of FET memory cells. Preferred memory cell circuitry, an array of such cells and vacuum means for applying voltages and irradiating simultaneously to effect writing have also been shown.

While the invention has been particularly shown and described with reference to preferred embodiments and method steps, it will be understood by those skilled in the art that the foregoing and other changes in form and details may be made therein without departing from the spirit and scope of the invention.

What is claimed is:

1. A method for storing information in a field effect transistor having an insulated gate and source and drain electrodes comprising the steps of:
   irradiating said insulated gate with an electron beam; and,
   applying potentials simultaneously to each of said transistor electrodes to permanently and reversibly change the threshold thereof to obtain conditions representative of both a binary "one" and a binary "zero."

2. A method according to claim 1 wherein the step of applying potentials to permanently change the threshold of said transistor includes the step of:
   applying potentials to said field effect transistor to permanently increase the threshold of said transistor.

3. A method according to claim 1 wherein the step of applying potentials to permanently change the threshold of said transistor includes the step of:
   applying potentials to said field effect transistor to permanently decrease the threshold of said transistor.

4. A method according to claim 1 further including the step of:
   applying at least a readout pulse to said field effect transistor in the absence of said electron beam to determine the conducting or nonconducting state of said field effect transistor.

5. A method according to claim 2 further including the step of
   sensing current flow in response to the condition of the threshold of said field effect transistor.

6. A method according to claim 1 wherein said field effect transistor is an NPN device.

7. A method according to claim 6 wherein the step of applying potentials to said transistor to permanently and reversibly change the threshold thereof includes the step of:
   applying voltages to the source, gate and drain electrodes such that the voltage of the gate electrode is less positive than the voltage on the source or the drain electrodes to increase the threshold voltage of said transistor.

8. A method according to claim 6 wherein the step of applying potentials to said transistor to permanently and reversibly change the threshold thereof includes the step of:
   applying voltages to the source, gate and drain electrodes such that the voltage on the gate electrode is more positive than the voltage on the source electrode and the drain electrode to decrease the threshold voltage of said transistor.

9. A method according to claim 1 wherein said field effect transistor is a PNP device.

10. A method according to claim 9 wherein the step of applying potentials to said transistor to permanently and reversibly change the threshold thereof includes the step of:
   applying voltages to the source, gate and drain electrodes such that the voltage on the gate electrode is less positive than the voltage on the source electrode and the voltage on the drain electrode to increase the threshold voltage of said transistor.

11. A method according to claim 9 wherein the step of applying potentials to said transistor to permanently and reversibly change the threshold thereof includes the step of:
   applying voltages to the source, gate and drain electrodes such that the voltage on the gate electrode is more positive than the voltage on the source electrode or the voltage on the drain electrode to decrease the threshold voltage of said transistor.

12. A memory cell comprising:
   an insulated gate field effect transistor having source, drain, and gate electrodes, means for subjecting said insulated gate to electron bombardment, and
   means connected to each of said transistor electrodes for applying potentials thereto to permanently change the threshold of said transistor to conditions representative of either a binary "one" or a binary "zero."

13. A memory cell according to claim 12 wherein said means to permanently change the threshold includes means for applying potentials to said transistor to reduce the threshold thereof.

14. A memory cell according to claim 12 wherein said means to permanently change the threshold includes means for applying potentials to said transistor to increase the threshold thereof.

15. A memory cell according to claim 12 wherein said field effect transistor is an NPN device.

16. A memory cell according to claim 12 wherein said field effect transistor is a PNP device.

17. A memory cell according to claim 12 further including means coupled to said transistor for determining the condition of the threshold of said transistor.

18. A memory cell according to claim 17 wherein said means for determining the condition of the threshold of said transistor includes a sense amplifier electrically coupled to said transistor responsive to the flow of current therethrough.

* * * * *